United States Patent [19] [11] Patent Number: 4,895,445
Granger [45] Date of Patent: Jan. 23, 1990

[54] SPECTROPHOTOMETER

[75] Inventor: Edward M. Granger, Rochester, N.Y.

[73] Assignee: Eastman Kodak Company, Rochester, N.Y.

[21] Appl. No.: 270,728

[22] Filed: Nov. 14, 1988

Related U.S. Application Data

[63] Continuation-in-part of Ser. No. 66,284, Jun. 25, 1987, abandoned.

[51] Int. Cl.$^4$ ............................. G01J 3/18; G01J 3/42
[52] U.S. Cl. .................................................. 356/328
[58] Field of Search ............... 356/308, 326, 328, 236

[56] References Cited

U.S. PATENT DOCUMENTS 3,874,799  4/1975  Isaacs et al. ..................... 250/226
4,060,327 11/1977  Jacobowitz et al. ............. 356/328
4,076,421  2/1978  Kishner ........................... 356/236
4,544,271 10/1985  Yamamoto ....................... 356/328
4,605,306  8/1986  Kaffka et al. .................... 356/334
4,613,233  9/1986  Wilson ............................ 356/328
4,636,074  1/1987  Levy et al. ....................... 356/328
4,652,761  3/1987  Kerr et al. ....................... 250/372

Primary Examiner—F. L. Evans
Attorney, Agent, or Firm—John B. Turner

[57] ABSTRACT

A spectrophotometer for operating in the reflection or transmission mode includes a collecting lens for directing non-collimated light from the sample being analyzed onto a diffraction grating. An imaging lens focuses diffracted light onto an array of sensors. Because the collecting lens directs non-collimated light at the grating, a substantially linear spectrum can be imaged on the array.

34 Claims, 6 Drawing Sheets

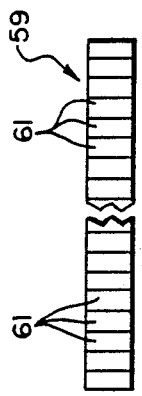
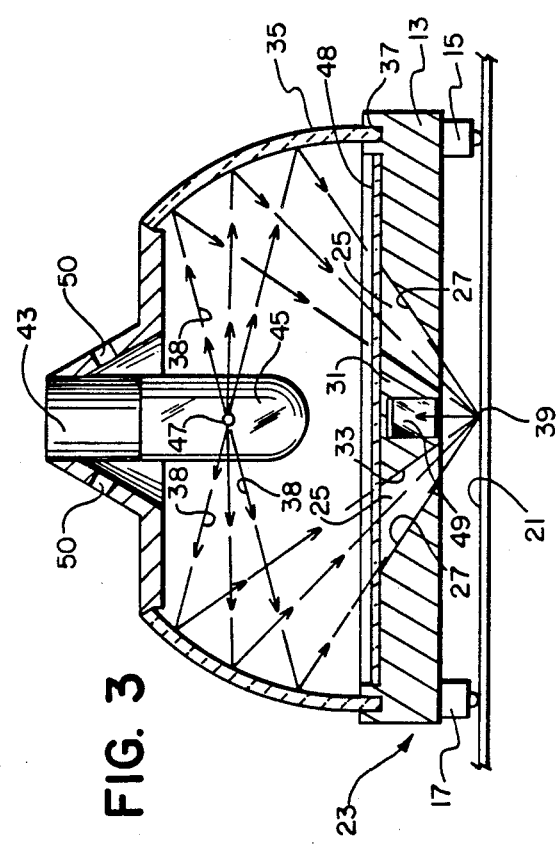

SPECTROPHOTOMETER

CROSS-REFERENCE TO A RELATED APPLICATION

This application is a continuation-in-part of my earlier filed U.S. application Ser. No. 066,284, filed June 25, 1987, now abandoned.

BACKGROUND OF THE INVENTION

1. Field of the Invention

This invention relates to spectrophotometers. Spectrophotometers are devices for measuring intensity of light in various parts of the spectrum and, as the term is used herein, for the purposes of this patent specification, the spectrum includes invisible as well as visible radiation.

2. Description Relative to the Prior Art

Spectrophotometers are known which direct collimated light from a sample to be spectrally analyzed, onto a diffraction grating. The diffracted light is focussed onto an array of detectors and is incident on the detectors as a spectrum. However, the spectrum is not linear, that is, the positions along a linear scale, of the components in the spectrum, are not linearly related to their wavelength. Thus, if it is desired to analyze the sample by determining the intensity of the light in each contiguous, say, 20 nm increment of the spectrum, a special detector array has to be created in which each detector has a length equal to the length, along the spectrum image, of the particular portion of the spectrum which the respective detector is intended to sense. Alternatively, each of the detectors may have the same dimension along the spectrum image and the signals derived from the detectors may be processed so that a plurality of signals is produced each being indicative of the intensity in a respective, say 20 nm, increment of the spectrum. Thus, with the prior art, if one wanted a linear spectral analysis, the problem has existed that it has been necesary either to create a special and dedicated detector array or it has been necessary to process the signals derived from the detectors to provide the desired signals.

It is an object of the present invention to overcome the problems of the prior art.

SUMMARY OF THE INVENTION

The object is achieved by the present invention which provides a spectrophotometer including means for illuminating a sample to be spectrally analyzed and a plurality of detectors disposed in a linear array in a common plane, with the detectors disposed on uniformly spaced centers. There are light directing and diffracting means for directing and diffracting light from the sample onto the array of detectors. The light directing and diffracting means includes a collecting lens, a diffraction grating, an imaging lens and a flare stop. The flare stop is located between the collecting lens and the diffraction grating. The collecting lens is supported between the sample and the flare stop. The sample and the flare stop are at the conjugates of the collecting lens. In accordance with the present invention, the collecting lens directs light from the sample as a non-collimated beam onto said diffraction grating through the flare stop whereby a plurality of virtual images, as "seen" by the imaging lens, of the flare stop are formed, there being a vertical image for each wavelength in the light from the sample. The plurality of virtual images is herein termed a virtual spectrum. The imaging lens is supported between the diffraction grating and the array with the flare stop and the array at the conjugates of the imaging lens. The imaging lens reimages the virtual spectrum onto the detector. The imaging lens is placed approximately normal to the mid-spectral central ray diffracted from the diffraction grating and going through the center of that lens. For the purposes of this patent specification, by mid-spectral central ray, is meant a ray located in a center of the cone of rays emanating from the flare stop, towards the grating and whose wavelength is the mean of the extreme values of the wavelength of the spectral range that the spectrophotometer is designed for. For example, if the spectrophotometer is designed for the wavelength range of 400–720 nm, the wavelength of the mid-spectral ray is 560 nm. A substantially linear relationship between the predominant wavelength of the light incident at any particular point on the array and the distance of that point along the array is produced by appropriately angularly disposing the diffraction grating relative to the light incident thereon and by appropriately orienting the plane of the array and the axis of the imaging lens. The array's orientation is given by the Scheimpflug condition which indicates how to correctly orient an image plane given the orientation of the object and the lens so that the image is paraxially focussed.

In an embodiment of the invention intended to work in the reflection mode the means for illuminating a sample includes a light source and the light directing and diffracting means are located at the same side of the sample as the light source when the sample is positioned relative to the spectrophotometer by the sample positioning means.

Advantageously, a mirror is provided for folding the path of light between the sample and the collecting lens whereby the light directing and diffracting means and the array are to one side of the region of the sample being analyzed.

The present invention also resides in a method of designing, or actually building, a spectrophotometer. This method includes sending a divergent cone of light into diffraction means, such as reflection or transmission grating, selection and orientation of the diffractive means relative to the incident cone of light and orientation of the detection means, such as a CCD array, in such a way as to result in a substantially linear relationship between the predominant wavelength of light incident at any particular point on the array and the distance of that point along the array.

An embodiment of the present invention will now be described, by way of example, with reference to the accompanying drawings, in which:

BRIEF DESCRIPTION OF THE DRAWINGS

FIG. 3 is a sectional view taken on the line III—III in FIG. 2;

FIG. 5 illustrates a detector array included in the spectrophotometer;

DETAILED DESCRIPTION OF THE PREFERRED EMBODIMENT

Figure 1:
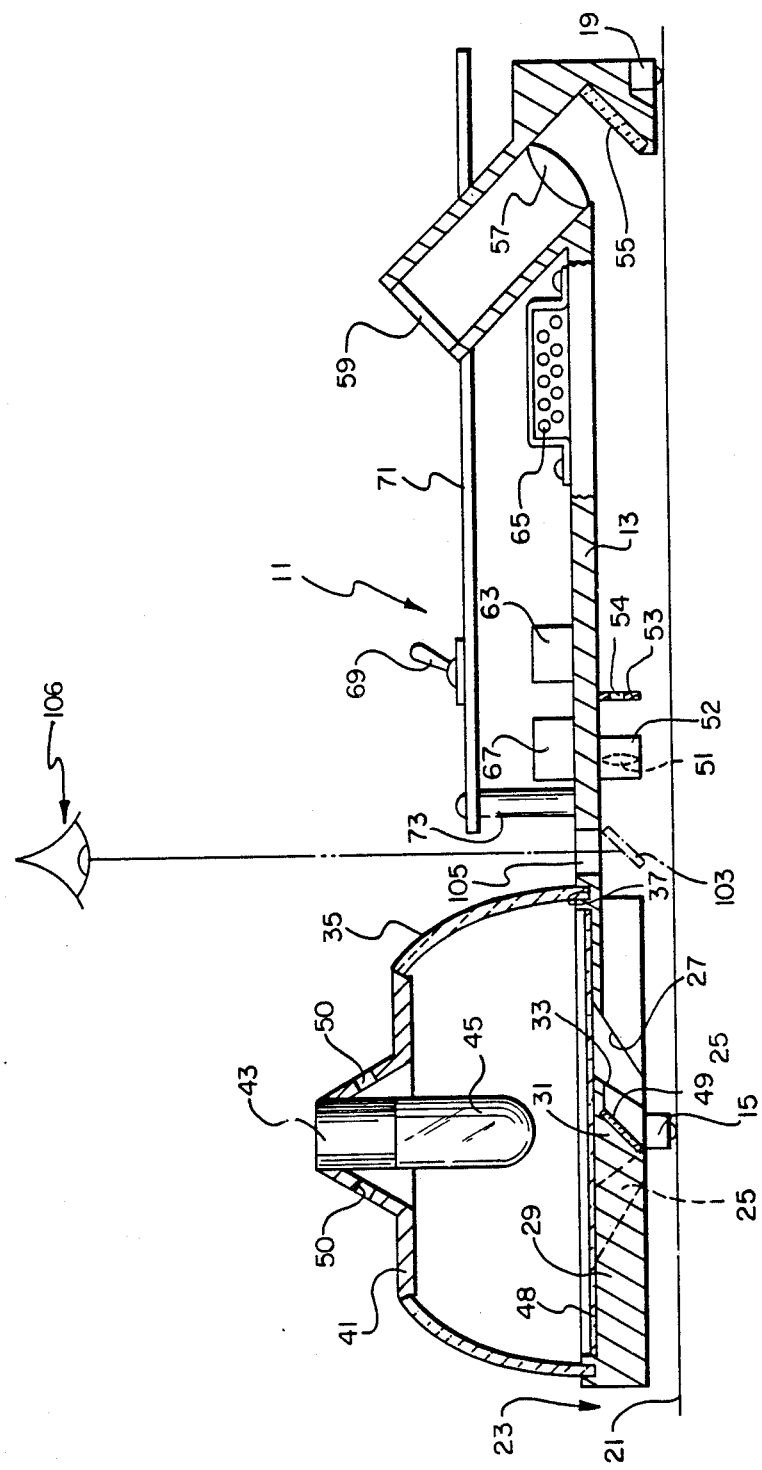
FIG. 1 is a cross-sectional view of a reflection spectrophotometer embodying the present invention and intended for use in the graphic arts industry.

In the accompanying drawings there is illustrated a spectrophotometer which is intended for use in graphic arts. It is adapted to be rolled over a printed press sheet laid out on a table.

The spectrophotometer 11 includes a chassis 13 having on its underside three spaced rollers 15, 17, 19. The rollers 15, 17, 19 are so formed as to support the chassis 13 above a table 21 with the chassis 13 generally parallel to the table 21. The rollers 15, 17, 19 are of fixed height, i.e., they have no resiliency, and permit hand manipulated movement of the spectrophotometer.

The chassis includes a sensing end portion 23 which has an aperture 25 through it. The aperture 25 is circular and the bounding surface 27 of the chassis is conical.

A three-legged spider 29 spans the aperture 25 and carries an island member 31. The member 31 is circular and concentric with the circular aperture 25 and has a conical peripheral surface 33.

A reflector 35 is disposed on the upper surface of the sensing end portion 23 of the chassis 13. The reflector 35 conforms to an ellipse and its inner surface reflects spectrally. The position of the reflector 35 on the chassis portion 23 is fixed, as by the large diameter end of the reflector being disposed in an annular trough 37 formed on the chassis portion 23.

It is arranged that the axis of the bounding surface 27 and the axis of the conical peripheral surface 33 of the island member 31 are coincident with the axis through the near and far foci of the elliptical form of the reflector 35. The apices of the conical forms of the surfaces 27 and 33 are at the far focus. It is also arranged that the far focus of the reflector 35 is in the plane defined by the contact points of the three rollers 15, 17, 19, i.e., the plane of the surface of the table 21 when the spectrophotometer is on the table 21. The far focus is indicated by reference numeral 39 in FIG. 3.

A closure member 41 closes the upper, smaller diameter end of the elliptical reflector 35 and carries a bulb holder 43. A 12 volt tungsten halogen bulb 45 is carried by the bulb holder 43. The holder is so positioned that the filament 47 of the bulb 45 is disposed at the near focus of the reflector 35. As is known, the filament of a 12 volt tungsten halogent bulb is relatively small; thus it can be said, with relatively minor approximation, that it lies at a point, namely, the near focus of the reflector.

It is a known fact that with an elliptical spectral reflector, any light ray which passes through the near focus will, after reflection, pass through the far focus. Some light rays 38 are indicated in FIG. 3. By appropriate choices of the diameters of the aperture 25 and of the island member 31, only light having an incident angle on the table 21 of 45°±n° reaches the far focus. In the present embodiment, n is 12. The reason for this control on the angle of incidence is the standard existing in the graphic arts industry that spectrophotometric measurements will be taken with the illuminating light incident at approximately 45°. In this embodiment the cone angle of the peripheral surface of the island member 31 is 66° and the cone angle of the bounding surface 27 is 114°. The chassis and the island member 31 prevent light having an inclination to that axis which joins the near and far foci, outside a predetermined range of inclinations, reaching the sample at the far focus.

The portion of the elliptical form of the reflector 35 chosen is such that light derived from the near focus will have an angle of 45°±n° to the axis passing through the near and far foci, after reflection.

A transmission filter 48 covers the aperture 25 and serves to modify the spectrum of the light reaching the far focus so as to bring the spectrum of sample illuminating light into accordance with graphic arts industry standards. The filter 48 is secured to the chassis portion 23 by screws 46 seen in FIG. 2.

The portion of the sensing end portion 23 of the chassis 13 not covered by the transmission filter 48 has ventilating apertures 44 to allow air to flow up into the space bounded by the reflector 35, to cool the bulb and surfaces on which light from the bulb 45 is incident. This cooling air flows out through small apertures 50 in the closure member 41.

On the underside of the island member 31 and on the axis passing through the near and far foci, is a planar mirror 49 inclined at 45° to the axis. The mirror 49 serves to direct light, reflected from a surface at and close adjacent around the far focus 39, in a direction generally parallel to the surface of the table 21 under the chassis 13.

That light which was reflected substantially perpendicularly off the sample and subsequently reflected by the mirror 49 is incident on a relay, collecting lens 51 carried in mounting means 52 on the underside of the chassis 13. The lens 51 images the sample on a flare stop 53, having an aperture 54, which is mounted from the underside of the chassis 13. Light which has passed through the aperture 54 of the flare stop 53 is then, as non-collimated light, incident on a reflection diffraction grating 55 which is oriented at angle (90−β°) to the axis 56 of the lens 51 which extends through the flare stop aperture 54. It is to be understood that, in other embodiments of the present invention, a transmission diffraction grating can be used instead of a reflection diffraction grating.

The diffraction grating 55 diffracts the light incident on it. Some negative first order diffracted light is incident on an imaging lens 57 and is focussed by the lens on a detector array 59 which is located at the side of the lens 57 remote from the diffraction grating 55. The detector array 59 and the flare stop 53 are at conjugates of the lens 57 so that the lens 57 images the flare stop 53 on the array 59. The array 59 is placed at a distance away from the imaging lens 57 given by the lens equation. It's orientation is given by the Scheimpflug condition. By negative first order light is meant the diffracted rays which are diffracted such that the angle between an incident ray and its diffracted ray is less than the angle between the incident ray and the zero order diffracted ray. In the present embodiment, the grating is blazed for the negative first order. Also, it is blazed for maximum energy at the blue end of the spectrum because the light source, namely the bulb 45, is tungsten and because the array 59 is made of silicon. The light source, being tungsten, is deficient in blue light and the array 59 being silicon, is less sensitive to blue light.

The array 59 includes a plurality (in the present embodiment there are 32) of individual sensors 61 (see FIG. 5) disposed in a line, in a common plane, with uniform spacing between centers.

In the present embodiment the plane in which the sensors 61 lie is parallel to the plane of the diffraction grating 55. However, in some other embodiments the relationship is not one of parallelism.

Figure 4:
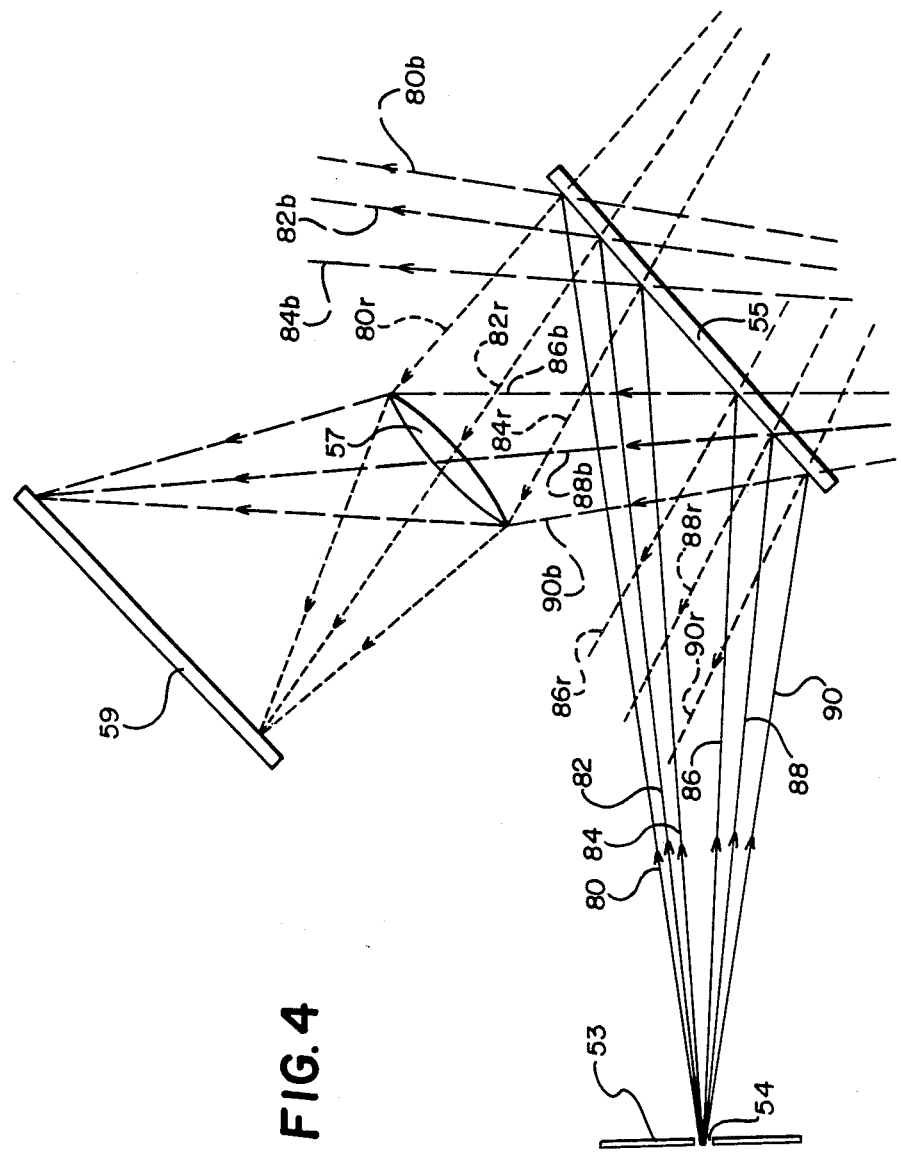
FIG. 4 is a diagrammatic representation of a portion of the optical system in the spectrophotometer illustrated in FIGS. 1, 2 and 3.

Reference is now made to FIG. 4, which shows the flare stop 53, the grating 55, the lens 57, the sensor array 59 and paths of rays between the stop 53 and the array 59. Rays 80, 82, 84, 86, 88 and 90 are rays originating from the sample and which have passed through the aperture 54 of the stop 53 and are incident on the diffraction grating 55. The rays 80-90 are polychromatic (assuming the sample is not monochromatic) and, self-evidently, represent the different wavelengths in the light from the sample. Each of the rays 80-90 incident on the grating 55 is diffracted into a plurality of diffracted rays of which only exemplary blue (with subscript "b" appended to the reference numeral) and red (with subscript "r" appended to the reference numeral) rays are shown in FIG. 4. In reality, the light spectrum can be subdivided into many spectral components that can be represented by many different rays incident on the grating, but only the red and the blue rays are shown, for the purpose of clarity of the drawing. The blue diffracted rays 80b-90b are shown by longer broken lines and the red rays 80r-90r are shown by shorter broken lines in FIG. 4.

It was stated above that the lens 57 images the stop 53 on the sensor array 59. In the known devices described above, in which collimated light is directed at the diffraction grating, a plurality of images of the stop aperture were created on the array by the lens, with each of the images having a different and discrete wavelength. However, in an embodiment of the present invention in which the rays incident on the diffraction grating are not parallel, that is, the incident light is non-collimated, the diffracted angle for light of each particular wavelength derived from one incident ray differs from the diffracted angle for light of the same wavelength derived from another incident ray. Thus, for each wavelength in the light leaving the grating there is a range of diffracted angles. The diffracted angles vary progressively with the location of the point of incidence of the incident ray across the grating. Thus, it becomes possible, by virtue of the lens 57 acting also as an aperture stop, to select the diffracted angle, or, rather, the median angle of a small range of incident angles, of light which will be imaged onto the sensor array by the lens 57. Of course, an aperture stop can be placed separately from the lens. Because such a selection is possible, it becomes possible to get linearity of the signals out of the sensors, in the sense that all of the uniformly spaced and uniformly sized sensors have incident on them radiation having the same bandwidth.

Figure 6:
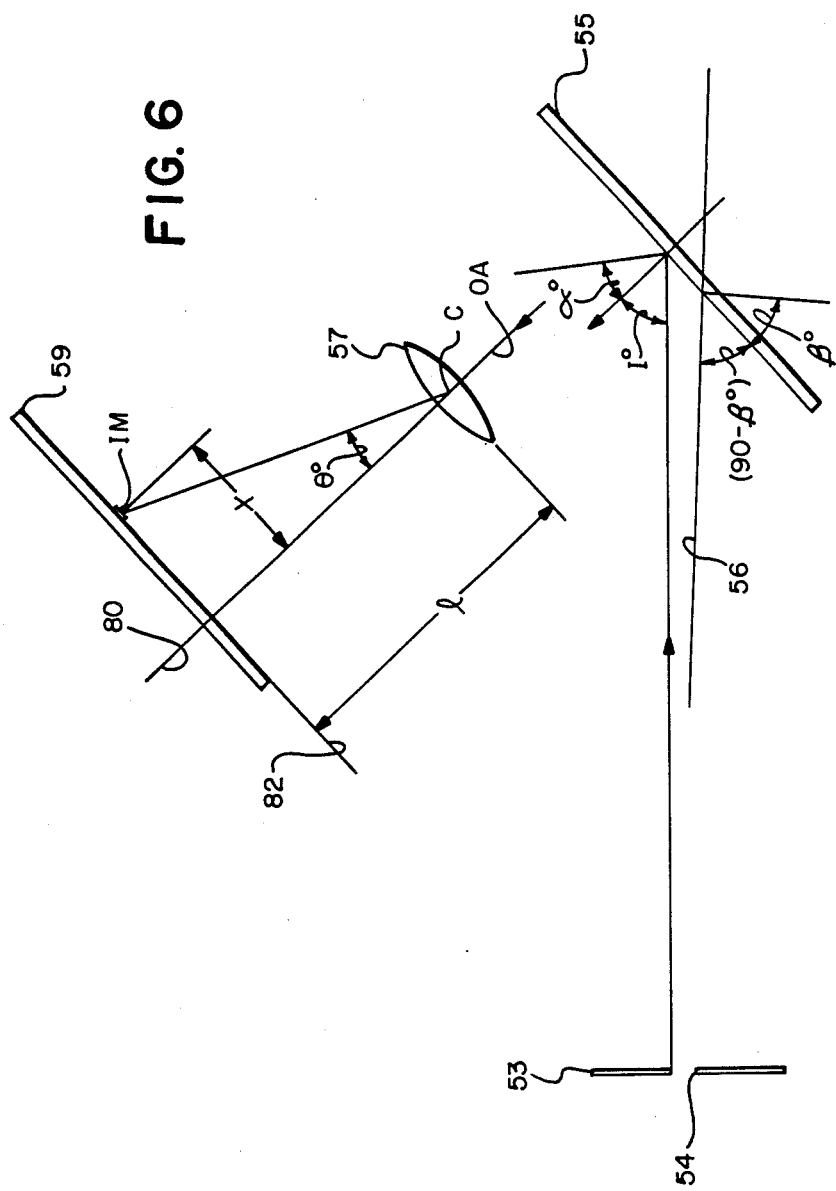
FIG. 6 is similar to FIG. 4 but shows different parameters.

Reference is now directed to FIG. 6. It is known that a diffraction grating produces maxima when $$\sin \alpha = m\lambda/S + \sin I \quad (1)$$

wherein $\alpha$ is the angle of diffraction for wavelength $\lambda$
m is an integer, the order of the maxima
S is the spacing the grating lines
I is the angle of incidence.
Thus, the diffracted angle is wavelength dependent.

Turning now to the relationship between the array 59, the lens 57 and the location of an image formed by the lens on the array, it can be said $$\tan \theta = x/l \quad (2)$$

wherein 1 is the distance of the array from the lens 57 measured along a line 80 perpendicular to the plane 82 of the array and passing through the center of the lens,
x is the distance of an image IM on the array from the aforesaid line 80 perpendicular to the plane 82 of the array and passing through the center C of the lens 57,
$\theta$ is the angle subtended by x at the center of the lens.

Because of the relationship between $\lambda$ and $\alpha$ expressed by $$\sin \alpha = m\lambda/S + \sin I$$

and the relationship between x and $\theta$ expressed by $$\tan \theta = x/l$$

and of the obvious relationship between $\theta$ (related to the rays incident on the lens) and $\alpha$ (related to the rays refracted by the imaging lens) the apparatus may be set up with orientations and relative dispositions of the grating, lens 57 and array 59 such that the angle of incidence of the diffracted light on the array falls along the relatively straight portion of the direction cosine curve so that there is a substantially linear relationship between $\lambda$ and x. In other words, there may be achieved a substantially linear relationship between the predominant wavelength of the light incident at a point on the array and the distance of that point along the array. The correct orientation and relative dispositions of the grating, lens 57 and array 59 can be achieved using one of the procedures outlined below:

One of the procedures to achieve the above design is a six-step procedure. By six-step procedure is meant the procedure comprised of the following six steps:

STEP 1:

A mid-spectral central ray 100 was traced to the grating. Knowing the grating ruling frequency and the order m, in this case, (m=-1) and using the standard grating equation (1), the direction of the diffracted mid-spectral center ray 100 is calculated for a given tilt of the grating, i.e., for a given angle of incidence, for example, in the preferred embodiment,
$I$ central spectrum wavelength $= ^I\lambda = 560$ nm.
The imaging lens 57 is then oriented so that it is centered on that ray and is normal to it.

The imaging lens 57 acts as an aperture stop. It accepts some of the diffracted rays and rejects the rest (FIG. 4). It also acts as an entrance pupil. Of course, in other embodiments an aperture stop can be placed separate from the lens.

STEP 2:

Given the position of the flare stop 53, the grating 55 and the imaging lens 57, for the entire wavelength range (400 to 700 for example), at each $\Delta\lambda$ increment, incident angle I, diffracted angle $\alpha$ and the height of the ray on the grating Yg of the following three rays are found:

1st Ray: The ray leaving the flare stop and incident at the center of the entrance pupil.

2nd Ray: The marginal ray leaving the flare stop and incident upon the upper edge of the entrance pupil.

3rd Ray: The marginal ray leaving the flare stop and incident upon the lower edge of the entrance pupil.

If the 2nd or 3rd ray is not defined by the imaging lens aperture, the marginal ray may be defined by the cone of light. The two marginal rays define the cone of light at a particular wavelength.

This step defines the (paraxial) bundle of all rays at each Δλ interval that pass through the entrance pupil of the lens.

Figure 7:
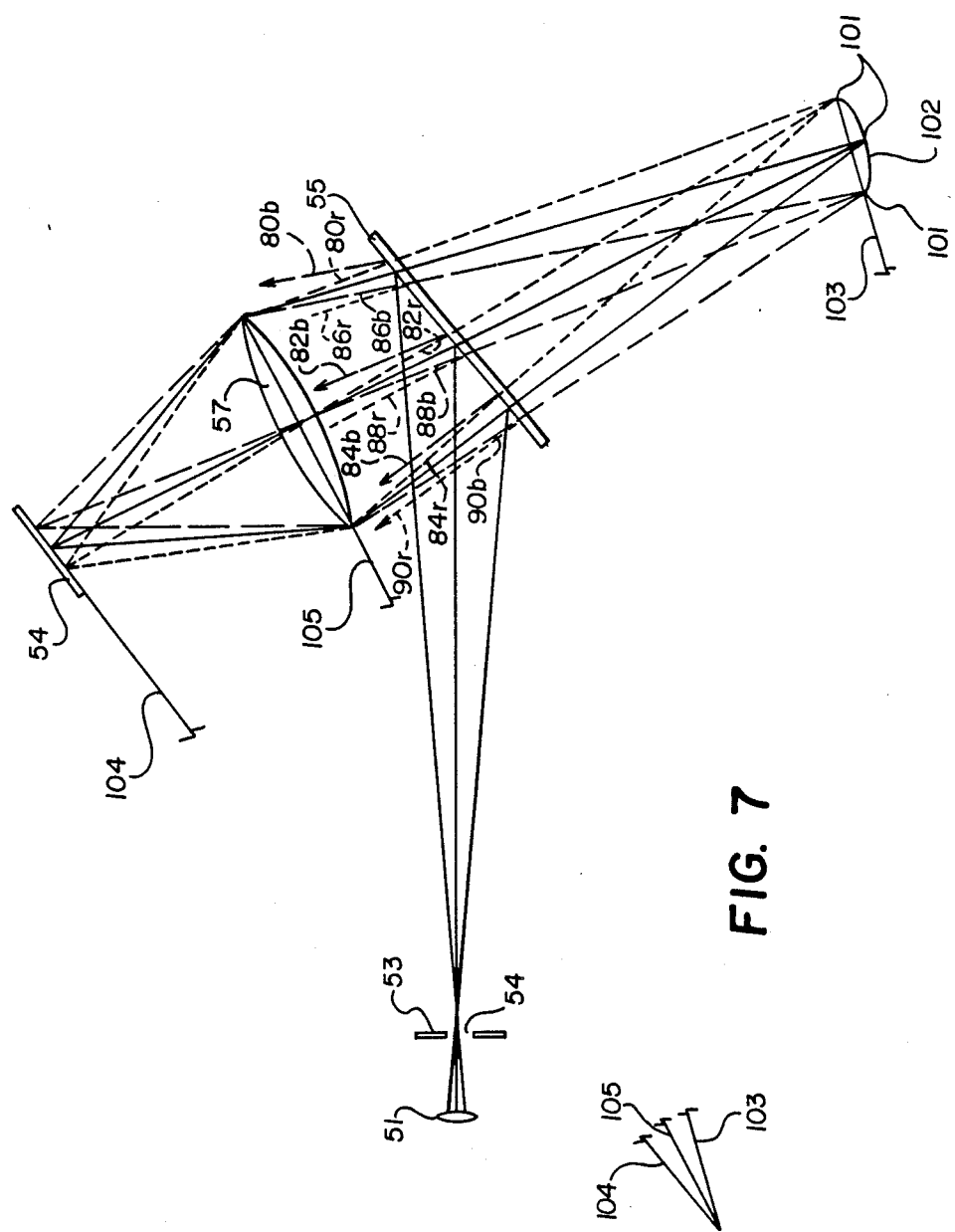
FIG. 7 is similar to FIG. 4, but further includes diagrammatic representation of the virtual spectrum formed behind the diffraction grating.

STEP 3:

For a particular wavelength, the imaging lens "sees" a virtual image 101 caused by the diverging bundle of light incident upon it. (FIG. 8) Thus, a virtual spectrum 102 is formed behind the grating (FIG. 7) as seen by the imaging lens 57. The imaging lens 57 reimages the virtual spectrum on the detector, such as a CCD array. The virtual spectrum is approximated by a straight line 103. The orientation of the detector is given by the Scheimpflug condition which states how to correctly orient an image plane, given the orientation of the object 102 (the straight line approximation of the virtual spectrum) and the lens 57, so that the image will be paraxially focussed.

STEP 4:

The degree of linearity of the spectrum is measured by comparing the average distance between spectral lines at Δλ (mean spread) and the actual spread (say between 420 nm and 440 nm, if Δλ=20 nm).

STEP 5:

The grating 55 orientation is then changed, thus resulting in a change in the incidence angle for the central spectral wavelength. The above four steps are repeated for each change in the grating orientation (for a given grating, imaging lens and distances) until the most linear spectrum is found.

STEP 6:

Using an essentially exact computer model, optical aberrations and other phenomena are taken into account; the orientation of the detector, such as the CCD array 59 and the grating 55, as well as the distances involved, are slightly adjusted.

In an alternative procedure, the best exact solution can be found by building an engineering prototype without doing the analysis outlined in steps 1–5. The best exact solution can be found by building an engineering prototype and using principles outlined in steps 1–5 to adjust the orientation of the grating 55, imaging lens 57 and the array 59.

A third procedure requires modeling the optical system using some of the principles outlined in steps 1 through 5 and using a software program, such as CODEV, and adjusting optical parameters until the best design is found.

A fourth procedure is a combination of the first two procedures. The best exact solution can be found by building an engineering prototype in the lab and by slightly adjusting the best configuration found by iterations through steps 1 to 5. Note that steps 1 through 5 can be computerized.

Each of the sensors 61 in the detector array 59 is connected to a memory 63 which serves to record separately each of a plurality of readings from each sensor. The memory 63 is mounted on the chassis 13 and is connected to a terminal block 65 with which a mating terminal block may be associated for taking data out of the memory 63 to a computer, not shown.

Also carried on the chassis is a 12 volt rechargeable battery 67 which supplies energy, through a control switch 69, to the bulb 45. The battery 67 is also connected to two pins of the terminal block 65 so that it may be recharged when the mating terminal block is connected up for taking the data to the computer.

The switch 69 is mounted in a handle 71 which is connected to the chassis 13 by four studs 73. The handle 71 and switch 69 are omitted in FIG. 2 so that components on the chassis may be seen.

Figure 2:
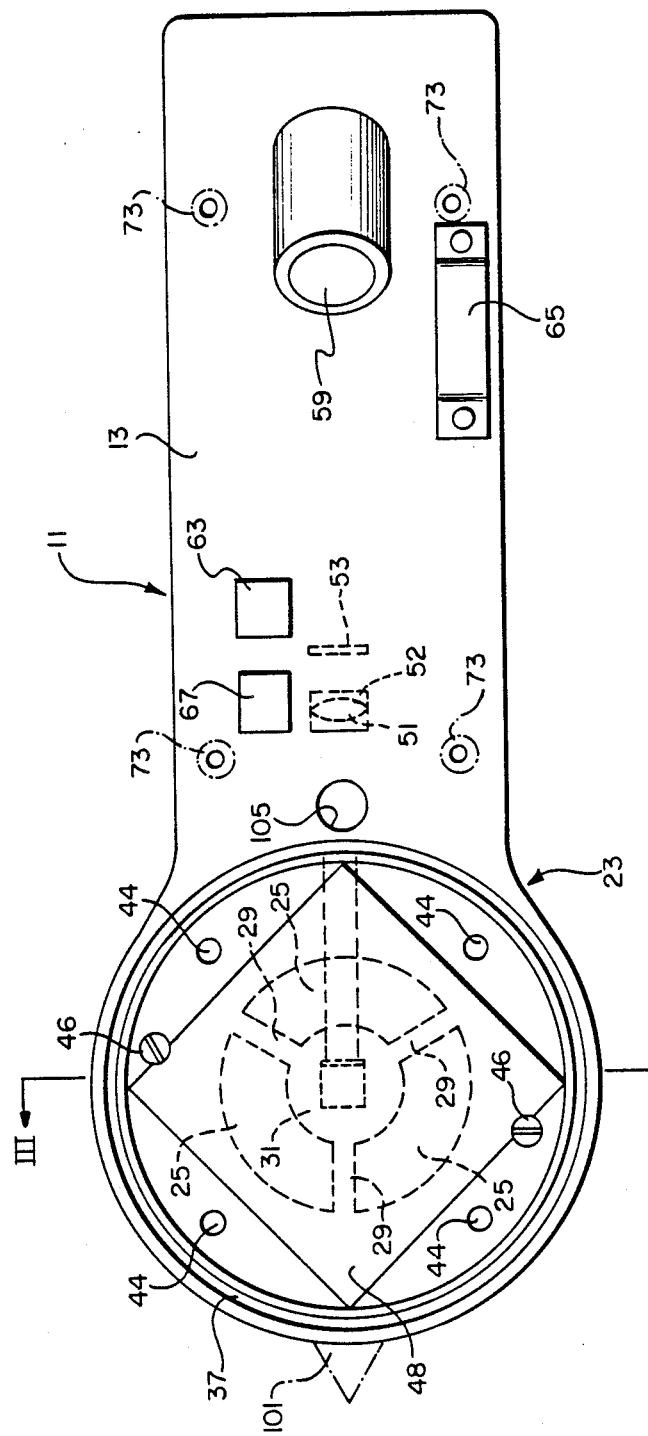
FIG. 2 is a plan view of the spectrophotometer illustrated in FIG. 1, with parts omitted for the sake of understanding.

The reflector 35, cover member 41, bulb holder 43 and bulb 45 are omitted in FIG. 2 to facilitate understanding.

As will be observed, the mirror 49, by folding the path of the light rays reflected off the sample at the far focus 39, allows the light directing and diffracting means, which includes the lens 51, flare stop 53, diffraction grating 55 and imaging lens 57, to be placed to one side of the region of the sample being analyzed.

The chassis 13 forms part of means for locating the collecting lens 51, the stop 53, the diffraction grating 55, the imaging lens 57, which also constitutes a second stop, and the array 59 in the required positional and orientational relationship to one another.

In operation, the battery 67 energizes the filament 47 and the memory 63 through switch 69. Light having passed through filter 48, is incident on the sample or table 21 at incidence angles between 33° and 57°. Light is reflected off the sample onto the mirror 49. The mirror 49 reflects light towards the lens 51. The lens 51 refracts light incident on it and forms an image of the sample on the flare stop 53. Light passes through the flare stop aperture 54 and onwards, as a non-collimated, divergent beam, to the diffraction grating 55.

In the present embodiment, the grating 55 has 600 lines per inch and the angle $\beta°$ is 19.6°. Negative first order diffracted light diffracted by the grating 55 is imaged by the lens 57 on the array 59. By virtue of the present invention, in which the light incident on the diffraction grating is not collimated, but is divergent, the spectrum on the array is such that there is a substantially linear relationship between the predominant frequency incident on a sensor and the distance of the sensor along the array. The term 'predominant frequency' is used because the light incident at any point along the array is not pure, it contains a band of wavelengths extending to either side of the predominant wavelength. This impurity is because the light incident on the diffraction grating is not collimated. The width of the band is determined by the size of the flare stop aperture 54.

In saying that there is a substantially linear relationship between the predominant frequency incident on a sensor and the distance of the sensor along the array, it is meant that the differences between predominant wavelengths on adjacent detectors are uniform, it being borne in mind that the spacings between centers of adjacent detectors is uniform.

The aforementioned substantially linear relationship is a great advantage, which is achievable with the present invention because the light incident on the diffraction grating is not collimated. The fact that the light to be incident on the diffraction grating does not have to be collimated also allows economy in the lens through which the light passes before being incident on the grating. The collector lens 51 may be a simple single element lens which is much less expensive than a collimating lens.

The above-described embodiment of the invention is a reflection spectrophotometer. It is to be understood that the present invention may also be embodied in a transmission spectrophotometer.

In the above-described embodiment, the detector array is parallel to the plane of the diffraction grating which, in turn, is perpendicular to the axis of the lens 57. Such an arrangement is particularly attractive from the manufacturing viewpoint but other arrangements which achieve the uniform bandwidth advantage are possible in accordance with the present invention.

In the above-described embodiment there is a transmission filter 48 covering the aperture 25. The filter 48 modifies the spectrum of the light reaching the far focus, i.e., the sample being analyzed. Instead of being located between light source and sample, a filter for similar purpose could be provided over the array 59. Such a filter in such a location would have the advantages of being smaller, less expensive, easier to change and less affected by heat from the source.

To run a spectral analysis test, a control surface, such as a piece of magnesium oxide, is placed at the far focus of the reflector 35. For convenience, the control surface is embodied in a table on which the spectrophotometer can be rested. The bulb 45 is energized by switching on the switch 69 and the signals produced by each of the sensors 61 in the detector array 59 are stored in the memory 63. In the case of the spectrophotometer being used in the graphic arts industry, a master test object (such as a Macbeth Color Checker designed by Kollmorgen Corporation of Hartford, Connecticut) is placed on a table and, with the bulb energized, the spectrophotometer is rolled over the master test object with the far focus 39 passing over each patch in succession. The patches may be read by column or by row. The computer to which the data is subsequently fed is sufficiently sophisticated that it can accept the data in either sequence and attribute an address to each read patch by comparing the sequence of read patches to a memory. The signals from each of the sensors 61 for each of the patches in the master are stored in the memory.

The test object contained in a sheet from the press is then substituted for the master and again the signals from each of the sensors 61 for each of the patches is stored in the memory.

The magnesium oxide test surface is then substituted for the test object and the signals from each of the sensors are stored in the memory.

The spectrophotometer is then connected to the computer by plugging its terminal block into the terminal block 65. The data is transferred to the computer and processed. At the same time, and subsequently until further readings have to be taken, the battery 67 is recharged. The beginning and final readings from the magnesium oxide control surface are compared to see if the light source has drifted in intensity and spectrum. If it has, a compensation can be built into the ensuing processing of the readings from the test object and the master.

The spectrophotometer is guided along the rows or columns of patches in the test patterns by manual control and human observance of the black lines bounding the columns and rows, or by relationship to a separate grid. To assist in this, the sensing end of the spectrophotometer may be made pointed as indicated by the broken line outline 101 in FIG. 2. The provision of the pointed end together with the elongate form of the spectrophotometer and the fact that it is of a size to be held in the hand, means that the device can be guided and moved along substantially straight line paths along the rows or columns of patches. If so desired, a reflex or half silvered mirror may be inserted in the optical path at the position indicated by reference numeral 103 is FIG. 1. An aperture 105 would be provided in the chassis 13 so that an observer, symbolically represented at 106, could see, via mirror 103 and mirror 49, what portion of a test object is located at the far focus 39. Portions of, or the entire, procedure could be automated.

Instead of reading a test object, the spectrophotometer could be used for reading pre-ordained small regions of a half tone image.

The above-described embodiment of the invention is intended for use in a very specific technology, namely, graphic arts. However, advantages may be gained in other embodiments also. For example, by virtue of the inexpensive optics usable because collimated light is not required and the inexpensive array and/or signal processing electronics usable because the spectrum image on the array is linear, embodiments may be made sufficiently inexpensively for many other purposes, for example:

an embodiment could be used in a paint store for matching paints with one another or to match a paint with a wallpaper or fabric sample. The signals derived from the detector array could be processed so that volumes of specific tints needed to produce a matching paint could be displayed on readouts or could be mixed automatically;

interior designers could match paints and fabrics etc.;

paper manufacturers could match colored paper to a specification;

packaging technologists could ensure the match of packaging and printing with a particular color associated with a particular trade dress;

stamp collectors could obtain readings of inks used on stamps and thereby detect forgeries or identify more closely the actual origin of a particular stamp;

forgeries of currency could be detected; and identification badges and passes could be easily and accurately analyzed.

It will be recognized that in some of these other embodiments it is not necessary to roll the device over a surface. In some cases legs could be substituted for the rollers. The legs would ensure the accurate spacing of the device from the target at the far focus. Alternatively, the device could be hinged to a base in the manner of a desk top stapler. The closest approach of the device to the base would be limited so that the test surface of a target material placed on the base would be located at the far focus.

It will also be recognized that in some embodiments of the invention it may be desirable for the spectrophotometer to operate into or in the infrared or ultra violet regions of the spectrum. In such embodiments, an appropriate light source would be used and the position of the array relative to the imaging lens would be adjusted appropriately so that the images in the selected portion of the spectrum would lie on the array.

The embodiment specifically described above is a reflection spectrophotometer. It is to be understood that the invention is applicable also to a transmission spectrophotometer. In such an embodiment the transmissive object to be spectrally analyzed is placed at the focus of the lens 51. Of course, there need be no mirror 49.

It will also be understood that the term spectrophotometer is to be interpreted as a device which may analyze the spectral components in not only the visible but aslo the invisible portions of the spectrum. Also, the term "light" as used herein, is to be understood as including not only the visible but also the invisible.

The invention has been described in detail with particular reference to a presently preferred embodiment, but it will be understood that variations and modifications can be effected within the spirit and scope of the invention.

What is claimed is:

1. A spectrophotometer including:
   means for illuminating a sample to be spectrally analyzed;
   a plurality of detectors disposed in a linear array in a common plane, with said detectors being disposed on uniformly spaced centers;
   light directing and diffracting means for directing and diffracting light from said sample onto said array of detectors;
   said light directing and diffracting means including:
   a collecting lens;
   a diffraction grating;
   an imaging lens; and
   a flare stop, said flare stop being supported between said collecting lens and said diffraction grating;
   means supporting said collecting lens between said sample and said flare stop with said sample and flare stop being at the conjugates of said collecting lens, whereby said collecting lens directs light from said sample as a non-collimated beam onto said diffraction grating through said flare stop;
   means supporting said imaging lens between said diffraction grating and said array, with said flare stop and said array at the conjugates of said imaging lens;
   said diffraction grating being angularly disposed relative to the light incident thereon and the plane of the array and the axis of said imaging lens being oriented, and the array and the imaging lens being disposed, to produce a substantially linear relationship between the predominant wavelength of the light incident at any particular point on the array and the distance of that point along the array.

2. A spectrophotometer as claimed in claim 1, wherein
   said imaging lens is so disposed as to accept first negative order diffracted light from said diffraction grating; and
   said array is so disposed as to have incident on it said first negative order diffracted light after refraction by said imaging lens.

3. A spectrophotometer as claimed in claim 1, including:
   means for positioning a sample at one conjugate of said collecting lens with said flare stop being at the other conjugate of said collecting lens.

4. A spectrophotometer as claimed in claim 3, wherein said means for illuminating a sample includes a light source, and said light directing and diffracting means are located at the same side of the sample as said light source when said sample is positioned relative to the spectrophotometer by said sample positioning means, whereby said spectrophotometer acts in a reflection mode.

5. A spectrophotometer as claimed in claim 4, including a mirror for folding the path of light between the sample and said collecting lens whereby said light directing and diffracting means and said array are to one side of the region of the sample being analyzed.

6. A spectrophotometer as claimed in claim 5, including:
   an elliptical spectral reflector, said light source being disposed at the near focus of the elliptical form of said spectral reflector and as said sample positioning means is adapted to position the sample at the far focus of the elliptical form of said spectral reflector.

7. A spectrophotometer as claimed in claim 6, including:
   means for restricting the light from said source which reaches the sample to light having incidence angles on the sample at said far focus within a predetermined range of incidence angles.

8. A spectrophotometer as claimed in claim 7, wherein:
   said mirror and said collecting lens are so arranged that light incident on said diffraction grating is light which was reflected substantially perpendicularly from the sample at said far focus.

9. A spectrophotometer as claimed in any one of claims 3 to 8, wherein said means for positioning a sample at one conjugate of said collecting lens includes rollers disposed in a common plane, said rollers allowing the spectrophotometer to be rolled over a surface of which said sample forms part.

10. A spectrophotometer as claimed in any one of claimes 1 to 8, wherein said diffraction grating is disposed at an angle of 70.4° to the axis of said collecting lens, said axis also passing through the aperture of said flare stop, and said grating contains 600 lines per inch.

11. A spectrophotometer as claimed in claim 5, including a second mirror and means for supporting said second mirror between said mirror for folding the path of light and said diffraction grating, said means for supporting said second mirror being adapted to pivot said second mirror between a first position at which it intercepts light from the first-mentioned said mirror and a second position at which it is out of the path of light from said first-mentioned mirror to said diffraction grating, said second mirror when in said first position enabling observation of the sample.

12. A spectrophotometer for analyzing a sample, including:
   a collecting lens;
   a first, flare stop;
   a diffraction grating;
   a second, aperture stop;
   an imaging lens;
   a plurality of detectors disposed in a linear array in a common plane, with said detectors being disposed on uniformly spaced centers; and
   means for locating said collecting lens, said flare stop, said diffraction grating, said second stop, said imaging lens and said detectors relative to one another and to the sample such that:
   the sample and said flare stop are at the conjugates of said collecting lens, whereby said collecting lens directs non-collimated light from the sample onto said diffraction grating; said diffraction grating being adapted to diffract the light incident on it from said collecting lens whereby a plurality of virtual images of said flare stop are formed, there being as many virtual images as there are wavelengths in the light from the sample;
   said second, aperture stop and said imaging lens receive diffracted light from said diffraction grating, with said flare stop and said array of detectors being at the conjugates of said imaging lens, whereby said imaging lens forms a plurality of images of said flare stop on said array of detectors, there being as many images as there are wavelengths in the light from the sample; and the images of the virtual images, formed by said imaging lens on said detector array are so disposed on said array that there is an approximately linear relationship between the predominant wavelength of the light incident on any particular point on the array and the distance of that point along the array.

13. A spectrophotometer as claimed in claim 12, wherein:

said locating means so locates said second, aperture stop and said imaging lens that the diffracted light passed by said second stop and refracted by said imaging lens forms images on said array which have a more nearly linear relationship between the predominant wavelength of the light incident on any particular point on the array and the distance of that point along the array, than would diffracted light not passed by said second stop and refracted by said second lens.

14. A spectrophotometer as claimed in claim 12, wherein:

the virtual images created by said collecting lens and the diffraction grating are located on a curved plane and said imaging lens is so located that said array and an imaginary plane approximating the curved plane are at the conjugates of said imaging lens.

15. A spectrophotmeter as claimed in claim 12 or 14, wherein said second, aperture stop and said imaging lens are so located as to have incident on them first negative order diffracted light from said grating.

16. A spectrophotometer as claimed in claim 12, wherein said second, aperture stop is said imaging lens.

17. A spectrophotometer as claimed in claim 12, including means for illuminating a sample to be analyzed.

18. A spectrophotometer as claimed in claim 17, wherein said means for illuminating a sample and said collecting lens are located at the same side of the sample whereby the spectrophotometer acts in a reflection mode.

19. A spectrophotometer as claimed in claim 17, including a mirror for folding the path of light between the sample and said collecting lens whereby said collecting lens, said diffraction grating, said imaging lens and said array are to one side of the region of the sample to be analyzed.

20. A spectrophotometer as claimed in claim 17, including means for restricting the light which is incident on the sample from said means for illuminating the sample, to light having incidence angles on the sample within a predetermined range of incidence angles.

21. A spectrophotometer as claimed in claim 19, wherein said mirror and said collecting lens are so located relative to one another and the sample that light incident on said diffraction grating is light which was reflected substantially perpendicularly from the sample.

22. A spectrophotometer as claimed in claim 14, wherein said diffraction grating, said imaging lens and said imaginary plane are so disposed relative to one another as to approximately satisfy the Scheimpflug condition.

23. A method of designing a spectrophotometer, for analyzing a sample, said spectrophotometer comprising:

(1) means for detecting light;

(2) light directing and diffracting means for directing and diffracting light from said sample onto said detecting means;

(3) means for rejecting some of the diffracted light, said method including:

(1) sending or tracing a divergent cone of light into said diffraction means;

(2) selecting an orientation of said diffraction means relative to the incident cone of light; and (3) orienting said detection means whereby a substantially linear relationship between the predominant wavelength of the light incident at any particular point on the array and the distance of that point along the array is produced.

24. A method according to claim 23, for designing a spectrophotometer, said light directing and diffracting means includes an imaging lens, and wherein the means for detecting light comprise a plurality of detectors disposed in a linear array in a common plane with the detectors being disposed on uniformly spaced centers, said method further including orientating the plane of said linear array relative to the axis of said imaging lens.

25. A method of designing spectrophotometers, said spectrophotometers comprising:

(1) means for detecting optical radiation, said detecting means comprising a plurality of detectors disposed in a linear array in a common plane, with said detectors being disposed on uniformly spaced centers;

(2) light directing and diffracting means for diffracting and directing light from said sample onto said array of detectors;

said light directing and diffracting means including:

a collecting lens;

a diffraction grating;

an imaging lens; and a first flare stop, said flare stop being supported between said collecting lens and said diffraction grating; and a second stop associated with said imaging lens;

said method including as a modeling step or physical step:

(1) placing said collecting lens between said sample and said flare stop with said sample and said flare stop being at the conjugates of said collecting lens;

(2) directing a non-collimated beam from said collecting lens through said flare stop and then onto said diffraction grating;

(3) placing said imaging lens and said second stop between said diffraction grating and said array;

(4) orienting said diffraction grating relative to the light incident thereon;

(5) orienting said imaging lens relative to mid-spectral ray going through the center of said imaging lens; and (6) orienting the plane of the array relative to the axis of said imaging lens whereby producing a substantially linear relationship between the predominant wavelength of the light incident at any particular point on the array and the distance of that point along the array.

26. A method according to claim 23, 24, or 25, including utilizing a computer program to perform the said method steps in order to find an exact or a paraxial design solution.

27. A method according to claim 25, further utilizing the following steps:
   (1) placing said imaging lens and orienting it so as to achieve a substantially linear spectrum;
   (2) tracing at least two rays for the range of wavelengths at uniform wavelength increments;
   (3) imaging the spectrum on the detecting means, utilizing said imaging lens;
   (4) analyzing the linearity of spectrum imaged on the array; and
   (5) iterating through steps 1 to 4 until an optimum degree of linearity is found.

28. A method according to claim 23 or 24, wherein said light directing and diffracting means includes a diffraction grating and an imaging lens and the imaging lens sees a virtual image created by the diffraction grating, said method including the step of mutually orienting the light detecting means, lens and the virtual image, created by the diffraction grating and seen by the imaging lens, such that a Scheimpflug condition is used to orient said detecting means.

29. A method according to claim 25, wherein said diffraction grating creates a virtual image, said method including the step of mutually orienting the detecting means, imaging lens and the virtual image such that a Scheimpflug condition is used to orient said detector means.

30. A method according to claim 23, 24, or 25, wherein said light directing and diffracting means includes an imaging lens and a diffraction grating, and the spectrophotometer further includes a flare stop, said flare stop and the detecting means being at the conjugates of the imaging lens, said method including:
   (1) placing the imaging lens substantially perpendicular to the ray located in the center of the cone of rays emanating from the flare stop towards the diffraction grating, the ray having a wavelength being the mean of the extreme wavelengths of the spectral range for which the spectrophotometer is designed; and
   (2) utilizing a Scheimpflug condition to approximately orient the detecting means.

31. A method according to claim 23, 24 or 25, wherein said diffraction grating creates a virtual image in the form of a virtual spectrum, and wherein said light directing and diffracting means includes an imaging lens, said method including making a straight line approximation of the virtual spectrum and utilizing said straight line approximation by reimaging it with the imaging lens on said detecting means with the orientation of the detecting means being determined by the Scheimpflug condition.

32. A method according to claim 27, wherein said diffraction grating creates a virtual image in the form of a virtual spectrum, including making a straight line approximation of the virtual spectrum and utilizing said straight line approximation by reimaging it with the imaging lens on said detecting means with the orientation of the detecting means being determined by the Scheimpflug condition.

33. A method according to claim 25 or 27, wherein the placement of said imaging lens and its orientation is determined by:
   (1) tracing a ray located in the center of the cone of rays issuing from the flare stop towards the diffraction grating, the ray having a wavelength being the mean of the extreme wavelengths of the spectral range for which the spectrophotometer is designed, to the diffraction grating:
   (2) calculating the direction of said central ray for a given tilt of the diffraction grating; and
   (3) orienting said imaging lens such that it is centered on, and is normal to, said central ray.

34. A method according to claim 23, 24 or 25, wherein some of the method steps are performed by numerical calculation and the remainder are performed practically in a laboratory set up.

* * * * *